Jan. 30, 1951 W. J. D. VAN DOBBENBURGH 2,539,979
BANKING REEL

Filed Oct. 4, 1946 2 Sheets-Sheet 1

Inventor
Willem J. D. van Dobbenburgh

By Albin F. Knight
Attorney

Jan. 30, 1951  W. J. D. VAN DOBBENBURGH  2,539,979
BANKING REEL

Filed Oct. 4, 1946  2 Sheets-Sheet 2

Inventor
Willem J.D. van Dobbenburgh
By Albin F. Knight
Attorney

Patented Jan. 30, 1951

2,539,979

UNITED STATES PATENT OFFICE 2,539,979

BANKING REEL

Willem J. D. van Dobbenburgh, Enka, N. C., assignor to American Enka Corporation, Enka, N. C., a corporation of Delaware Application October 4, 1946, Serial No. 701,110

4 Claims. (Cl. 242—127)

This invention relates to the manipulation of skeins of rayon prior to the final drying thereof and is more particularly concerned with a banking reel and skein carrier used in such operations.

In the spinning of rayon yarn it is sometimes customary to reel packages of rayon into skein form for after-treatment. The skeins are bleached and washed and are then rolled together in bundles, wrapped in a coarse cloth and placed in the basket of a centrifugal machine or hydro-extractor to remove as much water as possible. Following this operation the bundles of skeins are unwrapped, opened and hung on rods for passage through a machine in which the final drying is effected.

It has been customary in effecting the unwrapping and opening of damp skeins of rayon, to employ a device known as a banking reel. This device is comprised of two axially spaced elements connected together by a plurality of bars which define a generally cylindrical cage. The reel is supported at one end for rotation and a crank wheel is provided for effecting the manual rotation thereof. In using this device an operator removes the bundles of skeins from a box, unties the bundles, removes the skeins from the covering cloth and places them on the reel from its unsupported end, the operator opening each skein bundle manually to pass it over the cage portion of the reel. Once the skeins are supported on the reel the latter is rotated several times to open the skeins and to cause the component threads thereof to assume a regular and untangled pattern. Following this rotation another operator slides two bars axially of the banking reel from the unsupported end thereof through the loop defined by the portion of each skein which depends from the cage. These bars are then raised to lift the skeins and the operator backs away from the unsupported end of the reel and removes the skeins therefrom. Following this, one of the removing bars is withdrawn from the skein loop and the skeins are hung by the other removing bar on a carrier to be conveyed into the drier. Because of the large amount of time and work involved in this operation, it is customary to arrange the banking reels in pairs, one operator performing the necessary steps in loading each banking reel and the third operator removing the skeins, serving first one banking reel and then the other.

It is apparent that the foregoing operation is slow and consumes a large number of man hours to perform a necessary but simple operation. Furthermore, the work involved in lifting the skeins off of the banking reel by holding two bars at one end only is heavy and difficult.

It is an object of the present invention to provide for the opening of skeins of rayon in a manner which will require but one operator for each banking reel and wherein the work of that operator is light and may be quickly and conveniently accomplished.

Other objects and advantages of this invention will be apparent upon consideration of the following description of two embodiments thereof in conjunction with the annexed drawings wherein.

Figure 1:
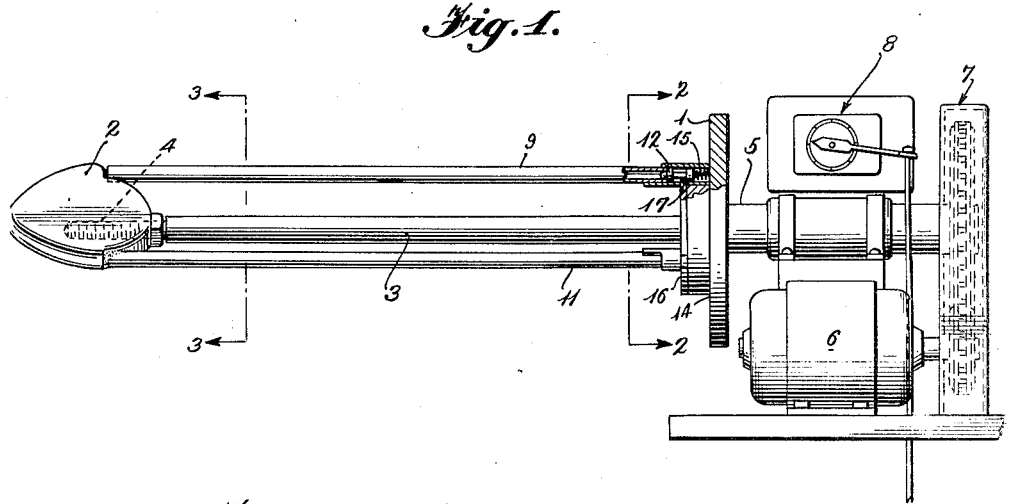
Figure 1 is a longitudinal sectional view of a banking reel constructed in accordance with the preferred form of the present invention.
Figure 2:
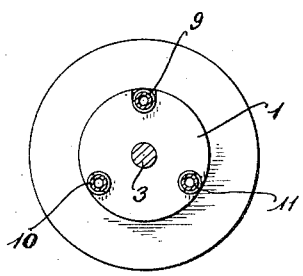
Figure 2 is a view in section taken along the line 2—2 of Figure 1.
Figure 3:
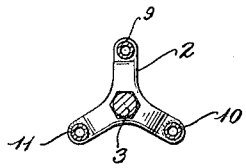
Figure 3 is a view in section taken along the line 3—3 of Figure 1.

Referring now in greater detail to Figures 1 to 5, inclusive, it can be seen that the banking reel shown is of cantilever construction and is made up of two axially spaced elements 1 and 2 which are connected together as a unit by a centrally disposed rod 3 which may be threaded or otherwise attached in a central socket 4 provided in the element 2 and which may pass through the element 1 to provide a shaft portion, not shown, which extends from the side of the element 1 remote from the element 2 through bearings 5. The rod 3 is keyed to the element 1 and the shaft portion mounted for rotation in bearings 5 is mechanically rotated from a suitable source of power such as a motor 6 which drives through a chain and sprocket assembly 7. Upon turning on the power to motor 6 the entire assembly comprised of element 1, rod 3 and element 2 is rotated for any desired number of turns. By the use of a timing mechanism 8, which per se forms no part of this invention, it is possible to cause the assembly to rotate for a predetermined number of turns before the power is automatically cut off.

Between the elements 1 and 2 extend three rods 9, 10 and 11 disposed in circumferentially spaced relation to define a triangular cage for supporting skeins. Rods 10 and 11 are permanently fixed in the elements 1 and 2 as by welding, see Figure 5. The third rod 9 is detachably mounted and held between the elements. In order to hold rod 9 in position, the mutually facing surfaces of the elements 1 and 2 are provided with projections 12 and 13, respectively, which are axially aligned to hold the rod 9 therebetween, the rod 9 containing sockets in each end to fit over the projections.

Figure 4:
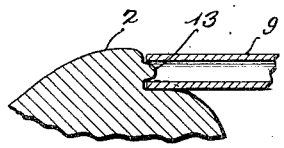
Figure 4 is a view in vertical section showing the mode of attachment of the detachable bar of Figure 1 to an end element of the banking reel.
Figure 5:
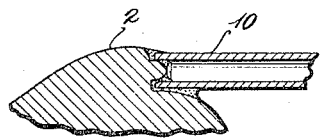
Figure 5 is a view in vertical section showing the mode of attachment of one of the fixed bars of Figure 1 to an end element of the banking reel.

The projection 13 in the element 2 is stationary, see Figure 4, but the projection 12 of the element 1 is mounted on base 14 which is biased axially in the direction of element 2 by a spring 15. To hold the base 14 and hence the projection 12 in a normal, extended, rod-supporting position, a central portion 16 of the element 1 is provided with an annular flange 17 which lies in the path of, and acts as a stop for, the base 14.

It can now be seen that the rod 9 is quick detachably held between the elements 1 and 2. To release the rod 9, it is only necessary to move the rod to the right, as viewed in Figure 1 to cause compression of the spring 15. The rod may then be lifted off of the projection 13 and removed from the cage.

Figure 6:
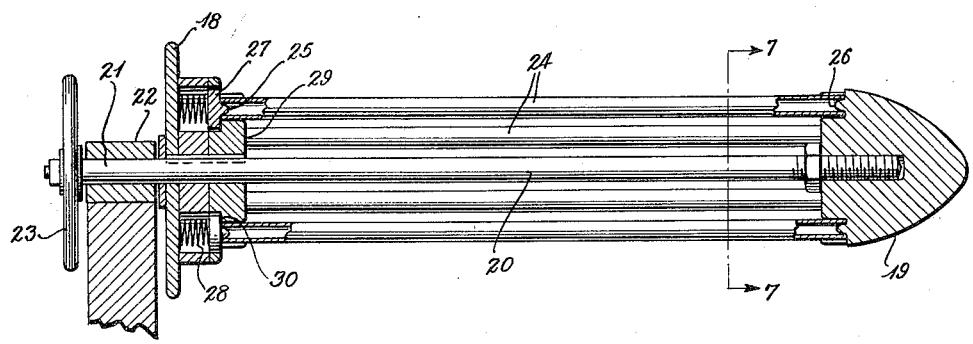
Figure 6 is a longitudinal sectional view of a modified form of banking reel which may be employed in accordance with the present invention.
Figure 7:
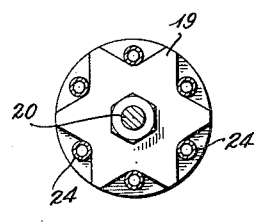
Figure 7 is a view in section taken along the line 7—7 of Figure 6.

In the modified form of the device shown in Figures 6 and 7, it can be seen that the banking reel is made up of two axially spaced elements 18 and 19 which are connected together as a unit by a centrally disposed rod 20 which may be threaded or otherwise attached in a central socket provided in the element 19 and which may pass through the element 18 to provide a shaft portion 21 which extends from the side of the element 18 remote from the element 19. The rod 20 is keyed to the element 18 and the shaft portion 21 is mounted for rotation in bearings 22 and is provided at one end with a crank wheel 23 keyed thereto so that upon manual rotation thereof the entire assembly, comprised of shaft portion 21, element 18, rod 20 and element 19, is rotated. In this modification, however, between the elements 18 and 19 there extend six rods 24 disposed in circumferentially spaced relation to define a generally cylindrical cage for supporting skeins. All of these rods are removable and may be in the form of hollow tubes or they may be rods provided with cavities or sockets at both ends. In order to hold these rods in position the mutually facing surfaces of the elements 18 and 19 are provided with circumferentially spaced projections 25 and 26 respectively, which are axially aligned in pairs, each rod 24 being held between each pair of projections 25 and 26 with the projections extending into its hollow interior or end sockets.

The projections 26 in the element 19 are stationary but the projections 25 of the element 18 are mounted on bases 27 which are biased axially in the direction of the element 19 by springs 28. To hold the bases 27 and hence the projections 25 in a normal, extended, rod supporting position, a central portion 29 of the element 18 is provided with an annular flange 30 which lies in the path of, and acts as a stop for, the bases 27.

In this case also the rods 24 are quick detachably held between the elements 18 and 19. To release them it is only necessary to move the rod to the left, as viewed in Figure 6, to cause compression of the spring 28. The rod may then be lifted off of the projection 26 and removed from the cage.

The form of the invention shown in Figures 1 to 4, inclusive, apparently offers certain advantages over the modification shown in Figures 6 and 7, although in some cases, it may be preferable to use the larger number of rods, all being detachably mounted. The preferred form having a triangular cage construction, as distinguished from a substantially circular configuration, seems to open up the skeins more efficiently, probably due to the bumping action of each rod during rotation, because the skeins hanging from the reel have a considerably larger opening than the opening defined by the rods. In order for the detachable rod to be quickly detected upon stopping of the reel, it is desirable to paint it a different color from the fixed rods. Moreover, it is feasible to weight a small portion of the periphery of element 1 at a point directly opposite the point where the detachable rod would pass through the element if projected. In this way when the timing mechanism shuts off the power, the weight on the element will cause the reel to cease turning at approximately the time that the detachable rod reaches its highest position. Whereas, three and six rods have been shown in the drawings, four or five, or even more than six might be employed to advantage so long as at least one rod is quick detachably held in position.

Figure 8:
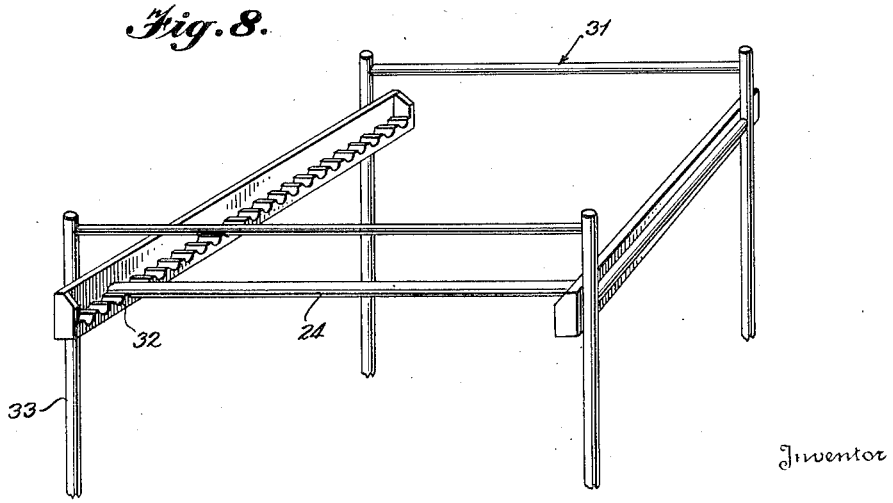
Figure 8 is a perspective view of a skein carrier constructed for coaction with a part of the banking reels of Figures 1 and 6.

In use, the banking reels, shown in Figures 1 and 6, present important advantages over conventional banking reels in which the cage is entirely made up of permanently attached slats or rods extending between axially spaced elements for, after the skeins have been opened by rotation of the banking reel, the operator can remove them by simply detaching the uppermost rod, the rod being gripped at its opposite ends with the skeins hanging therebetween. Once the rod is removed, the operator still holding the rod walks to the left of the apparatus, as it is viewed in Figure 1 or to the right as viewed in Figure 6, causing the rod supported skeins to move to the right and slide off the nose of the elements 2 and 19 respectively. The operator still gripping the rod with the skeins hanging therefrom, walks to the skein carrier 31, shown in Figure 8, and hangs the rod in an opposed pair of notches 32 which are so spaced between the framework 33 as to accommodate the rods. A new rod is then inserted in the banking reel and the skeins to be opened are moved axially over the elements into position to be supported by the cage defined by the rods. The banking reel is turned either automatically or manually to open the skeins and the entire operation is again repeated.

It will be understood that by the arrangements just described, which are susceptible of modification within the scope of this invention, it is possible for two operators working with a pair of banking reels to accomplish in the same time and with less effort, the work which previously required three operators.

What is claimed is:

1. A banking reel for opening skeins of rayon comprising axially spaced rod holding elements connected together as a unit, cantilever means supporting said unit for rotation, means for rotating said unit, and a plurality of rods extending between said elements and defining a skein holding cage, at least one of said rods being detachable in an axial direction of the reel and compressible means normally urging the detachable rod into engagement with its rod holding elements, whereby, upon completion of the banking operation, the operator may remove skeins from the reel by removing the rod and lifting the rod supported skeins off of the unsupported end of the unit.

2. A banking reel for opening skeins of rayon comprising axially spaced rod holding elements connected together as a unit, means supporting said unit for rotation from one of its ends, means for rotating said unit, and a plurality of rods extending between said elements and defining a generally cylindrical skein holding cage, resilient means for holding some of said rods in position and said rods being detachable in an axial direction of the reel, whereby, upon completion of the banking operation, the operator may remove a skein from the reel by removing one of the rods and lifting the rod supported skeins off of the unsupported end of the unit.

3. A banking reel for opening skeins of rayon comprising axially spaced rod holding elements connected together as a unit, means for supporting said unit for rotation from one end thereof, means for rotating said unit, a plurality of rods having recesses in their opposite ends, a plurality of axially aligned, circumferentially spaced projections on the mutually facing surfaces of said elements, aligned pairs of said projections being adapted to receive therebetween one of said rods, and spring means associated with at least one projection of each pair for resiliently holding the projection in rod retaining position.

4. A banking reel for opening skeins of rayon comprising axially spaced rod holding elements connected together as a unit, means for supporting said unit for rotation from one end thereof, means for rotating said unit, a plurality of tubular rods, a plurality of axially aligned, circumferentially spaced projections on the mutually facing surfaces of said elements, aligned pairs of said projections being adapted to receive therebetween one of said rods, and spring means associated with at least one projection of each pair for resiliently holding the projection in rod retaining position.

WILLEM J. D. van DOBBENBURGH.

REFERENCES CITED

The following references are of record in the file of this patent:

UNITED STATES PATENTS

| Number | Name | Date |
|---|---|---|
| 312,970 | Case | Feb. 24, 1885 |
| 866,613 | Arnold | Sept. 24, 1907 |
| 1,281,802 | Madill | Oct. 15, 1913 |
| 1,354,369 | Anderson | Sept. 28, 1920 |
| 1,462,589 | Watrous | July 24, 1923 |
| 1,868,634 | Gregory | July 26, 1932 |
| 1,876,279 | Dietrich | Sept. 6, 1932 |

FOREIGN PATENTS

| Number | Country | Date |
|---|---|---|
| 529,507 | France | Sept. 10, 1921 |